(12) United States Patent
Huang

(10) Patent No.: US 7,020,138 B2
(45) Date of Patent: Mar. 28, 2006

(54) NETWORK COMMUNICATION SYSTEM AND METHOD OF DYNAMIC ROUTING

(75) Inventor: James Huang, Taipei Hsien (TW)

(73) Assignees: Wistron Corporation, (TW); Acer Incorporated, (TW)

( * ) Notice: Subject to any disclaimer, the term of this patent is extended or adjusted under 35 U.S.C. 154(b) by 862 days.

(21) Appl. No.: 09/759,343

(22) Filed: Jan. 16, 2001

(65) Prior Publication Data

US 2002/0034186 A1 Mar. 21, 2002

(30) Foreign Application Priority Data

Jul. 28, 2000 (CN) ............................... 89115078 A

(51) Int. Cl.
*H04L 12/28* (2006.01)
*G06F 15/173* (2006.01)

(52) U.S. Cl. ..................... 370/392; 370/401; 709/242
(58) Field of Classification Search ................ 370/238, 370/252, 392, 411, 396–401; 709/238–242
See application file for complete search history.

(56) References Cited

U.S. PATENT DOCUMENTS

| 5,675,741 | A | * | 10/1997 | Aggarwal et al. | ........... 709/242 |
| 5,708,654 | A | * | 1/1998 | Arndt et al. | ................ 370/242 |
| 6,052,736 | A | * | 4/2000 | Ogle et al. | .................. 709/244 |
| 6,119,171 | A | * | 9/2000 | Alkhatib | ...................... 709/245 |
| 6,208,656 | B1 | * | 3/2001 | Hrastar et al. | ............... 370/401 |
| 6,275,492 | B1 | * | 8/2001 | Zhang | ......................... 370/392 |
| 6,671,259 | B1 | * | 12/2003 | He et al. | ..................... 370/238 |
| 6,738,352 | B1 | * | 5/2004 | Yamada et al. | ............. 370/238 |
| 6,748,446 | B1 | * | 6/2004 | Sato et al. | ................... 709/241 |
| 2002/0031131 | A1 | * | 3/2002 | Yemini et al. | .............. 370/401 |
| 2002/0186682 | A1 | * | 12/2002 | Kawano et al. | ............. 370/351 |
| 2003/0118051 | A1 | * | 6/2003 | Ooms | ......................... 370/471 |
| 2005/0076122 | A1 | * | 4/2005 | Khawand et al. | ........... 709/226 |

* cited by examiner

*Primary Examiner*—Hassan Kizou
*Assistant Examiner*—Hong Sol Cho
(74) *Attorney, Agent, or Firm*—Michael Bednarek; Pillsbury Winthrop Shaw Pittman LLP

(57) ABSTRACT

A system and method of dynamic routing is provided. When a connection cannot be built, execute the follows. (a) A sending-host transports messages to destination-host. If connection built, the method ends, otherwise go to step (b). (b) Find a series of routers, and put IP-addresses of routers into a list. (c) Judge whether list includes at least one IP-address; if yes, go to step (d), otherwise step (i). (d) A pointer points to the last. (e) Find a domain of IP-address pointed. (f) If a message-routing-in-charge host is found, go to step (g), otherwise step (h). (g) The sending-host transports messages to message-routing-in-charge host, and go to step (a). (h) If IP-address pointed is the first one, go to step (i), otherwise step (j). (i) The sending-host keeps messages for a period, and go to step (a). (j) Move pointer to point to the previous, and go to step (e).

10 Claims, 4 Drawing Sheets

10

NETWORK COMMUNICATION SYSTEM AND METHOD OF DYNAMIC ROUTING

This application incorporates by reference Taiwanese application Serial No. 89115078, Filed on Jul. 28, 2000.

BACKGROUND OF THE INVENTION

1. Field of the Invention

The invention relates in general to a network communication system and method of dynamic routing, and more particularly to a network communication system and method for efficiently determination of a message-transporting path between two hosts on the Internet. When two hosts cannot effectively connect to each other, the network communication system of the invention uses the method of dynamic routing to find the most suitable routing host.

2. Description of the Related Art

At present on the Internet, the network communication system that transports messages asynchronously (store and forward) between two hosts transport messages routinely according to either pre-built message-transporting paths or related data of network connection. The former is static routing while the latter is dynamic routing.

The network communication system transporting messages by the static routing way has to include a static routing table for recording message-transporting paths called routing paths between any two hosts on the Internet. When a sending host sends a message to a destination host, the routing path is the order of passing hosts that aid to transport messages to the destination host by storing and forwarding. When the sending host cannot directly transport messages to the destination host, the network communication system retrieves a routing path between the two hosts from a static routing table. Messages are then transported to the destination host via the order of passing hosts of the routing path.

Referring to FIG. 1, it shows a schematic diagram of a network 10. As shown in FIG. 1, there are five hosts, A, B, C, D, and E, on the network 10. According to connection relationship of any two hosts, a static routing table can be built as shown in the following Table 1.

TABLE 1

| Sending host | Destination host | Routing path |
|---|---|---|
| A | B | |
| A | C | |
| A | D | B |
| A | E | C |
| B | A | |
| B | C | A |
| ... | ... | ... |
| C | E | |
| ... | ... | ... |

Table 1 shows that host A cannot directly connect to host E. Therefore, when host A tries to send messages to host E, the network communication system retrieves a routing path from the Table 1. As shown in Table 1, messages of host A have to be routed by host C before arriving at host E. Accordingly, host A first routes messages to host C and then host C transports the messages to host E. However, there are generally more than one routing path between two hosts on the Internet. As shown in FIG. 1, an alternate connecting path from host A to host E is to go through host B then host D before arriving at host E. If the bandwidth between host A and host C is narrow, the transporting speed becomes slow. At this time, the alternate routing path may be faster instead. However, since this alternate path is not set in Table 1, the messages cannot be routed this way. Thus it can be seen that the static routing way is not flexible and cannot dynamically change the routing path according to practical network situation. As such, static routing cannot route messages in the optimum path and consequently is not efficient.

The network communication system transporting messages by the dynamic routing way can use pre-built related data of network connection to find a suitable message-transporting path. The network communication system has to first build the related data of network connection, such as network topology, bandwidth, or cost of connection. When a sending host tries to transport messages to a destination host, the network communication system uses an algorithm to find a suitable routing path. The algorithm can be the minimum-cost or shortest-path method. The network communication system can dynamically choose to use either method to produce different routing paths.

According to connection relationship of any two hosts on the network 10 in FIG. 1, the network communication system can build related data of network connection between any two hosts shown in the following Table 2.

TABLE 2

| Host | Host | Bandwidth | Cost |
|---|---|---|---|
| A | B | 10 Mbps | 1 |
| A | C | 64 Kbps | 3 |
| B | D | 1 Mbps | 2 |
| C | D | 10 Mbps | 1 |
| C | E | 1 Mbps | 2 |
| D | E | 10 Mbps | 1 |

The data established in Table 2 is a network topology, i.e. connection relationship between any adjacent hosts. The bandwidth of network connection of any adjacent hosts are built in Table 2 and the costs are defined according to the bandwidth. The higher the cost is, the longer the transporting time is. Likewise, the lower the cost is, the faster the speed of network transportation is and the shorter the transporting time is. The network communication system transporting messages by the dynamic routing way has to pre-build a table of network connection, such as Table 2.

Table 2 shows that host A and host E cannot directly build a connection. Accordingly, when the sending host A tries to transport messages to the destination host E, the network communication system first retrieves a message-transporting path from Table 2. The method of selecting a routing path can be based on practical network situation to find a suitable routing path. In general, the method of selecting a routing path is either the minimum-cost or shortest-path method. The shortest path is a path with minimum routing hosts between the sending host to the destination host. If the shortest-path method is used, the routing is only through host C. However, the cost of this routing path is five. If the minimum cost method is used, the routing path through hosts B and then D is selected since the cost is only four. As a result, when routing messages, it is a property of dynamic routing that the network communication system can select an algorithm to determine a suitable routing path according to practical network situation.

However, regardless of which, static or dynamic, routing is in operation, related data of network connection, such as Tables 1 and 2, have to be pre-built by network administrators. Two disadvantages to this are:

(1) The network communication system cannot automatically and efficiently react to the changing network situations in time (i.e. increase of bandwidth, network disconnections, and/or breakdown of hosts).

(2) The workload of network administrators increases when the network situations change.

SUMMARY OF THE INVENTION

It is therefore an object of the invention to provide a network communication system for efficiently determining a message-transporting path between two hosts on the Internet and a method of dynamic routing. When the two hosts cannot effectively build a connection, the network communication system of the invention uses the method of dynamic routing to find the most suitable routing host. It is not necessary for the network communication system and method of the invention to build up the related data of network connection in advance. The invention can automatically and efficiently react to network situations to find the optimum message-transporting path. That is, the invention can determine the most suitable routing host(s) to proceed to route messages with. Thus the invention not only reduces the workload of network administrators but also efficiently react to changes in practical network situations to dynamically change routing paths in order to enhance the efficiency of transportation.

According to the above-identified objects of the invention, when two hosts cannot effectively build a connection on the Internet, the network communication system of the invention uses the method of dynamic routing to look up the most suitable routing host. The method includes the following steps. (a) A sending host directly transports messages to a destination host. If the sending host can effectively build a network connection and transport messages to the destination host, the method ends, otherwise the method proceeds to step (b). (b) The system finds a series of routes that can be effectively connected and past from the sending host to the destination host. The Internet protocol (IP) addresses of the series of routers are successively put into a list. (c) The system judges whether the list includes at least one IP address. If so, the method proceeds to step (d), otherwise the method proceeds to step (i). (d) The system moves a pointer to point to the last IP address of the list. (e) The system finds a domain of the IP address presently pointed by the pointer. (f) If the system finds a message-routing-in-charge host in the domain, the method proceeds to step (g), otherwise the method proceeds to step (h). (g) The sending host transports the messages to the message-routing-in-charge host. The message-routing-in-charge host is regarded as another sending host and then the method proceeds to step (a). (h) If the IP address pointed by the pointer is the first IP address of the list, the method proceeds to step (i), otherwise the method proceeds to step (j). (i) The sending host keeps the messages for a predetermined time and then the method proceeds the step (a). (j) The system moves the pointer to point to an IP address previous to that presently pointed in the list and then the method proceeds the step (e).

BRIEF DESCRIPTION OF THE DRAWINGS

Other objects, features, and advantages of the invention will become apparent from the following detailed description of the preferred but non-limiting embodiments. The description is made with reference to the accompanying drawings, in which.

DESCRIPTION OF THE PREFERRED EMBODIMENT

The design of the invention is to make use of existing services of the Internet to achieve the function of automatically and efficiently routing messages. It is not necessary for the network communication system to pre-build a data of network connection. The existing services of routers on the Internet are enlisted to obtain data to generate routing paths.

Figure 1:
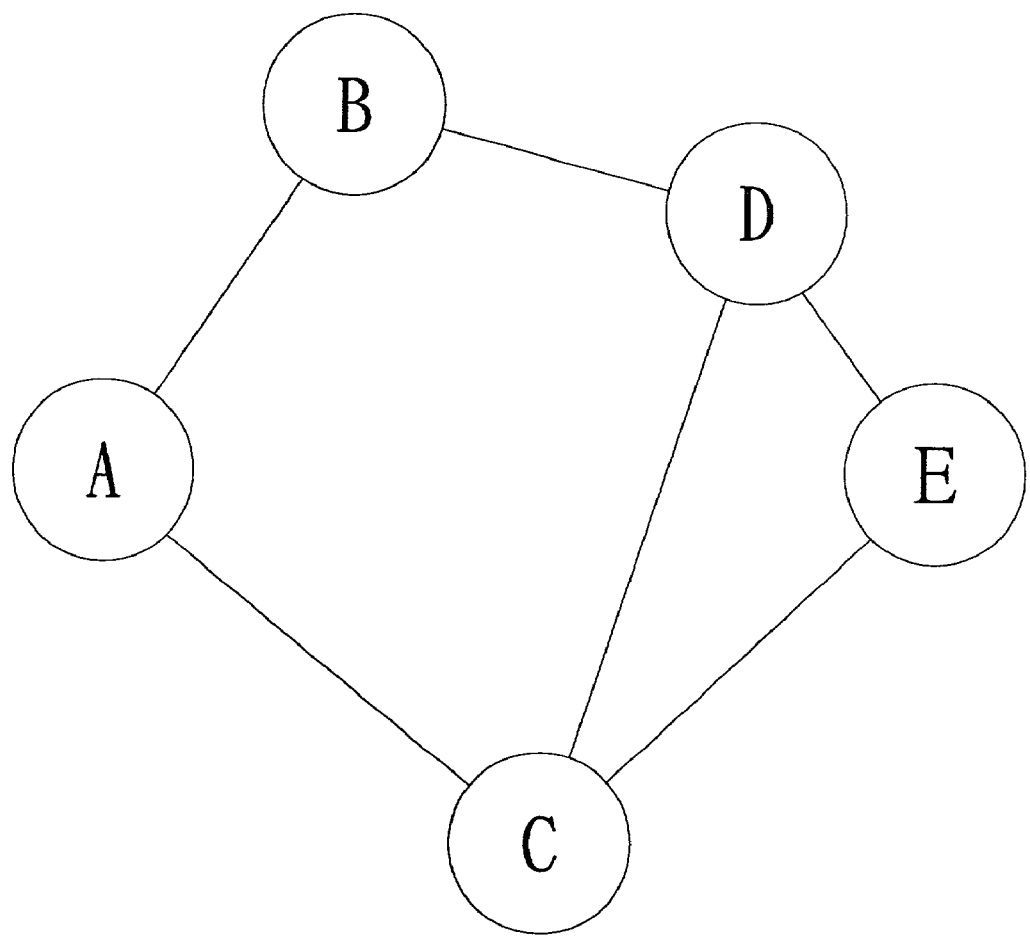
FIG. 1 (Prior Art) is a schematic diagram of a network.
Figure 2:
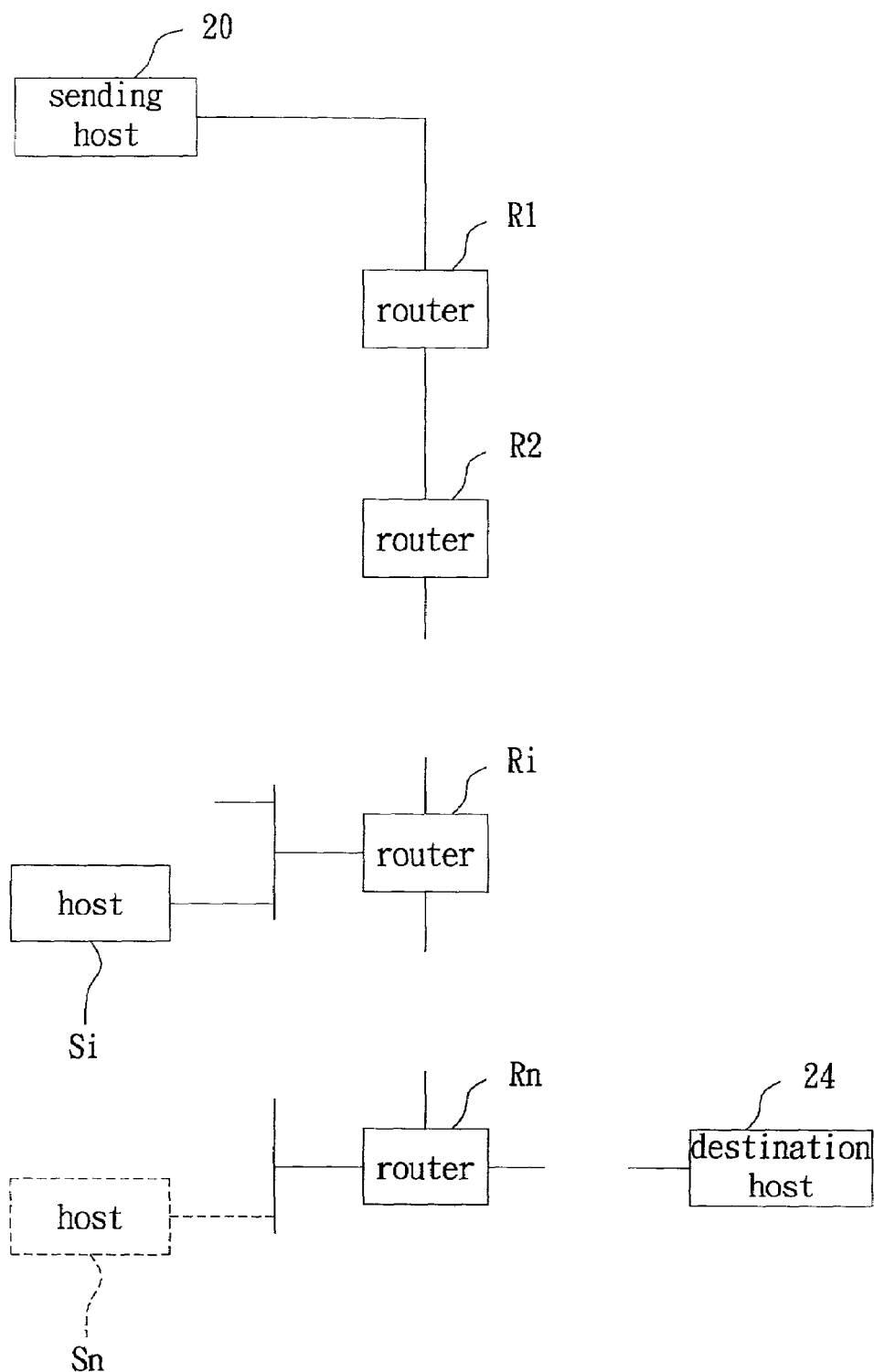
FIG. 2 is a sketch diagram of a message-transporting path between a sending host and a destination host on the Internet.

Referring to FIG. 2, it shows the sketch diagram of a message-transporting path between a sending host 20 and a destination host 24 on the Internet. As shown in FIG. 2, the sending host 20 routes messages to the destination host 24 via several routers R1, R2, R3, . . . , and Rn. Every router R1, R2, R3, . . . , and Rn respectively has a corresponding Internet protocol (IP) address IP1, IP2, IP3, . . . , and IPn which is in a corresponding domain. Every domain may include a corresponding host Si ($i \in \{1, 2, 3, \ldots, n\}$) to route messages.

Figure 3:
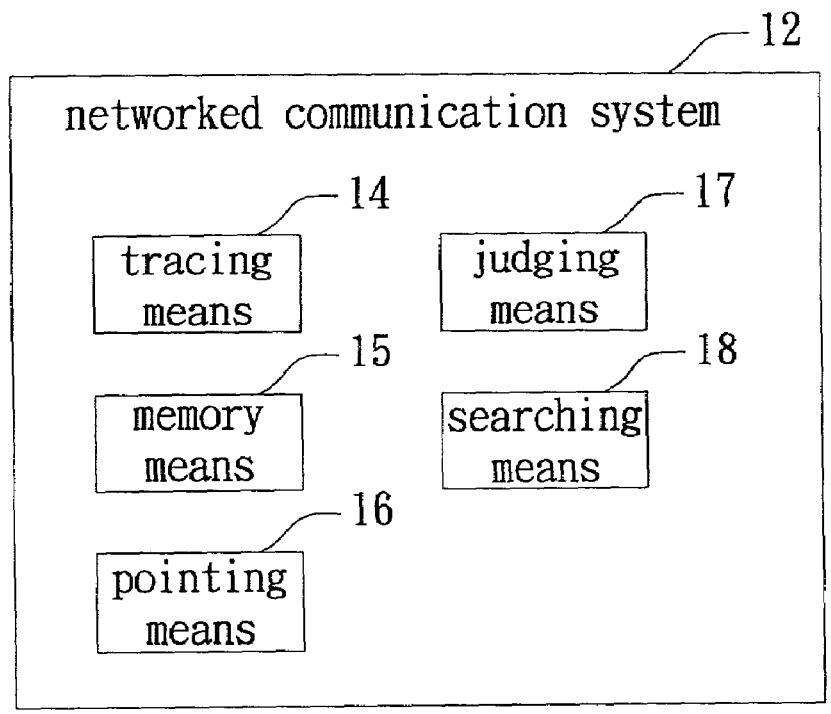
FIG. 3 is a functional block diagram of the network communication system of the invention.
Figure 4:
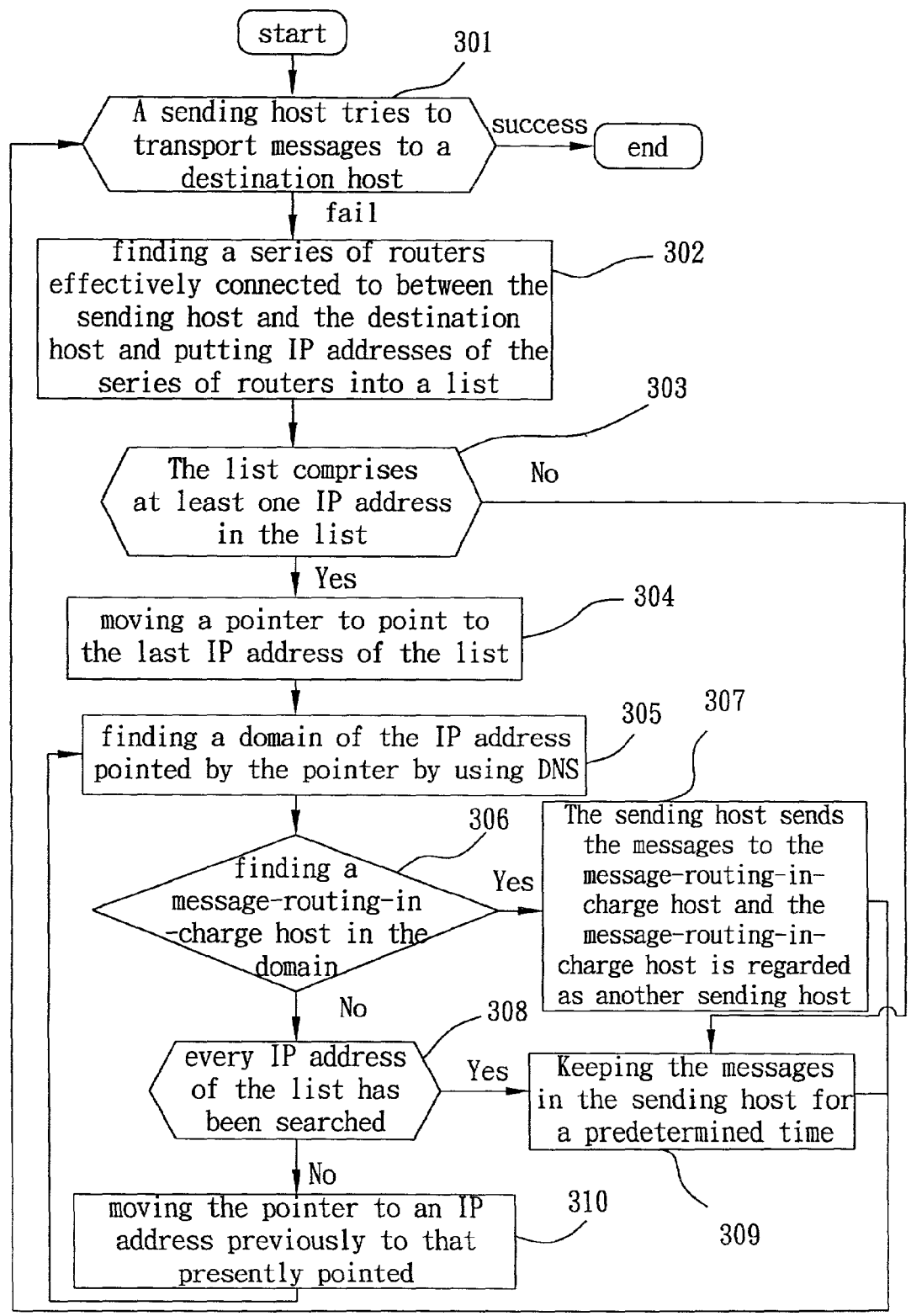
FIG. 4 is a flowchart of the method of dynamic routing of the network communication system in FIG. 3.

Referring simultaneously to FIG. 3 and FIG. 4 where FIG. 3 illustrates the functional block diagram of the network communication system 12 of the invention and FIG. 4 shows the flowchart of the method of dynamic routing of the network communication system 12. As shown in FIG. 3, the network communication system 12 includes a tracing means 14, memory means 15, pointing means 16, judging means 17, and searching means 18.

In step 301, the sending host 20 tries to transport messages to the destination host 24. If the sending host 20 does not successfully build a connection to the destination host 24, the method proceeds to step 302. If the sending host 20 effectively sends messages to the destination 24, the method ends.

In step 302, the tracing means 14 uses a method, same as the tracing path program (trace route), to find a series of routers between the sending host 20 and the destination host 24. The IP addresses IP1, IP2, IP3, . . . , IPn of the routers are successively put into a list of IP addresses and stored in the memory means 15.

The sending host 20 tries to send IP datagrams to the destination host 24 in order to obtain the series of routers R1, R2, R3, . . . , and Rn between the sending host 20 and the destination host 24. The head of an IP datagram includes a time-to-live (TTL) field and every router that receives the IP datagram subtracts one from the value of the TTL field. Therefore, the value of the TTL field can be used to count how many routers the IP datagram passes. When a router receives an IP datagram having a TTL field with a value of zero, the router abandons the IP datagram and sends back a time-out message of Internet Control Message Protocol (ICMP) to the sending host. Accordingly, the sending host can obtain an IP address of the router by receiving an IP datagram including the ICMP time-out message.

For example, the sending host 20 tries sends an IP datagram having an TTL field with a value of one to the destination host 24. Router R1 first receives the IP datagram and subtracts one from the value of the TTL field. Then the router R1 abandons the IP datagram and sends back an ICMP time-out message to the sending host 20. The IP address IP1 of the first router R1 of the routing path is then obtained. The sending host 20 then sends an IP datagram having a TTL field with a value of two to the destination host 24. The transporting path of the IP datagram first passes router R1 which subtracts one from the value of the TTL field of the IP datagram. Next, router R2 receives the IP datagram and subtracts one from the value of the TTL field again. Router R2 then abandons the IP datagram and sends back an ICMP time-out message to the sending host 20. Accordingly, the sending host 20 obtains the IP address IP2 of the router R2. The sending host 20 repeatedly executes the above steps until the sending host 20 does not receive any ICMP time-out message; that is, the IP datagram is unable to be transported to next router. The network communication system 12 then successively puts the IP addresses IP1, IP2, IP3, . . . , IPn of the series of routers R1, R2, R3, . . . , Rn into the list of IP addresses.

In step 303, the judging means of the network communication system 12 judges whether the list includes at least an IP address. If so, the method proceeds to step 304, otherwise the method proceeds the step 309 whereby the messages are kept in the sending host 20 for a predetermined time before the method proceeds to step 301.

In step 304, the pointing means 16 moves a pointer to point to the IP address IPn of the last router Rn of the list. Then, the method proceeds to step 305.

In step 305, the searching means 18 uses the Domain Name Service (DNS) to find a domain of the IP address of the router Rn pointed by the pointer.

Next, in step 306, the searching means 18 uses the DNS to find the message-routing-in-charge host Sn in the domain of the IP address IPn. If the message-routing-in-charge host Sn is found, the method proceeds to step 307 where the sending host 20 sends the messages to the message-routing-in-charge host Sn. Otherwise the method proceeds to step 308.

In step 308, the judging means 17 judges whether every IP address of the list has been searched. That is, the judging means 17 judges whether the pointer is moved to point to the IP address of the first router of the list. If so, it means that there is no host that can route the messages in the domains of IP addresses IP1, IP2, IP3, . . . , IPn of corresponding routers R1, R2, R3, . . . , Rn. The method then proceeds to step 309. In step 309, the messages are kept in the sending host 20 for a predetermined time, and then the method proceeds to the step 301. If the pointer does not point to the IP address of the first router, the method proceeds to step 310.

In step 310, the pointing means 16 of the network communication system 12 moves the pointer to point to a previous IP address of the list. Then the method proceeds to step 305 and the searching means 18 keeps on searching for a host Si that can route messages.

There are two methods by which the searching means 18 to use the DNS to look up a message-routing-in-charge host in a specified domain.

(1) An IP address of a message-routing host is registered beforehand in the Well Know Service (WKS) record of the DNS. The system can use a way of querying the WKS record to find the IP address of the message-routing-in-charge host.

(2) In the DNS, a name of message-sending service is regarded as an alias of the message-routing host. The system can then use the name of message-sending service as a querying name to find the IP address of the message-routing-in-charge host. For example, WWW is regarded as an alias of the World Wide Web service and SMTP is regarded as an alias of the Simple Mail Transfer Protocol service.

In step 307, after the sending host 20 transports the messages to the message-routing-in-charge host Si, the host Si is regarded as another sending host. After waiting for a predetermined time, the method proceeds to step 301 and keeps on transporting the messages to the destination host 24.

Additionally, in step 309, because the network communication system 12 does not find any host that can aid to route the message in the domains of all routers on the routing path, the messages are kept in the present sending host 20. After waiting for a predetermined time, the method proceeds to step 301 and keeps on transporting the messages to the destination host 24.

Generally, any two hosts on the Internet can directly connect to each other. Accordingly, the method of dynamic route of the invention can be applied to the following two situations:

(1) Both the sending host and destination host connect to the Internet by a dial-up network and both hosts do not simultaneously connect to the Internet every now and then. Therefore, the sending host has to transport messages to a routing host permanently connected to the Internet and then the routing host sends messages to the destination host.

(2) The dedicated lines respectively connected from the domain of the sending host and domain of the destination host to the Internet are congested in different time slots. Therefore, the sending host can transport messages to a routing host connecting to the Internet when the dedicated line of the domain of the sending host is not congested. The routing host can then send messages to the destination host when the dedicated line of the domain of the destination host is not congested.

As a result, when the sending host and destination host do not directly and efficiently build a connection, the sending host can first transport the message to a routing host that is nearer to the destination host. The routing host then sends the message to the destination host.

Advantages of the network communication system and method of dynamic routing in the above description of the embodiment of the invention are as follows:

(1) Network administrators need not additionally build related data of network connection except registering a message-routing host in the DNS.

(2) The invention can efficiently react to practical situations of the Internet to find the most suitable message-routing host because the invention can dynamically and efficiently find a series of router effectively connected. Between two hosts, according to different practical situations of the Internet, the invention can find different series of routers, i.e. different message-transporting paths.

(3) If the sending host and destination host are not permanently connected to the Internet, the sending host can proceed the routing action via another routing host permanently connected to the Internet in order to effectively transport messages to the destination host.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network communication system for efficiently determining a message-transporting path between a sending host and destination host on the Internet by finding a routing host when the sending host cannot effectively connect to the destination host, the system comprising:
- a tracing means for finding a series of routers which can be effectively connected to between the sending host and destination host and successively putting the routers' IP addresses into a list;
- a memory means for storing the list;
- a pointing means for pointing a pointer to an IP address of the list;
- a judging means for judging whether the list comprises at least one IP address and judging whether the IP address pointed by the pointer is the first IP address of the list; and
- a searching means for finding a domain of the IP address pointed by the pointer and finding a message-routing-in-charge host in the domain;
- wherein at the beginning, when the judging means judges that the list comprises at least one IP address, the pointing means moves the pointer to point to the last IP address of the list and when the searching means can not find the message-routing-in-charge host in the domain of the IP address pointed by the pointer, the pointing means moves the pointer to point to an IP address previous to that presently pointed in the list, wherein the pointing means continuously moves the pointer to point to a previous IP address until the searching means finds out the message-routing-in-charge host or the judging means judges that the pointed IP address is the first IP address of the list.

2. The system according to claim 1, wherein the tracing means uses a path-tracing program to find the series of routers between the sending host and the destination host; the sending host sends an IP datagram having a time-to-live (TTL) field with a value of one to the destination host, and obtains an IP address of the first router by receiving an Internet control message protocol (ICMP) time-out message from the first router; the sending host continuously sends an IP datagram having a TTL field with a value repeatedly increased by one in order to obtain the IP address of the series of routers which can be effectively connected until the sending host does not receive any ICMP time-out message.

3. The system according to claim 1, wherein the searching means uses the Domain Name Service (DNS) to find the domain of the IP address pointed by the pointer and uses an IP address of a message-routing host registered beforehand in the Well Know Service (WKS) Record of the DNS as a way of querying the WKS record to find the IP address of the message-routing-in-charge host.

4. The system according to claim 1, wherein the searching means uses the DNS to find the domain of the IP address pointed by the pointer and uses the property of regarding a name of message-sending service as an alias of the message-routing host to find the IP address of the message-routing-in-charge host by using the name of the message-sending service as a querying name.

5. A method for efficiently determining a message-transporting path between a sending host and destination host on the Internet by finding a routing host when the sending host cannot effectively connect to the destination host, the system comprising:
   (a) finding a series of routers which can be effectively connected to between the sending host and destination host and successively putting the routers' IP addresses into a list;
   (b) storing the list;
   (c) pointing a pointer to an IP address of the list;
   (d) judging whether the list comprises at least one IP address and judging whether the IP address pointed by the pointer is the first IP address of the list; and
   (e) finding a domain of the IP address pointed by the pointer and finding a message-routing-in-charge host in the domain;
   wherein, when judging whether the list comprises at least one IP address, moving the pointer to point to the last IP address of the list and if the message-routing-in-charge host in the domain of the IP address pointed by the pointer cannot be found, moving the pointer to point to an IP address previous to that presently pointed in the list, and continuously moving the pointer to point to a previous IP address until the message-routing-in-charge host is found or determining that the pointed IP address is the first IP address of the list.

6. The method according to claim 5, wherein step b uses a path-tracing program to find the series of routers between the sending host and the destination host; the sending host sends an IP datagram having a time-to-live (TTL) field with a value of one to the destination host, and obtains an IP address of the first router by receiving an Internet control message protocol (ICMP) time-out message from the first router; the sending host continuously sends an IP datagram having a TTL field with a value repeatedly increased by one in order to obtain the IP addresses of the series of routers which can be effectively connected to until the sending host cannot receive any ICMP time-out message.

7. The method according to claim 5, wherein the step e uses the Domain Name Service (DNS) to find the domain of the IP address pointed by the pointer.

8. The method according to claim 5, further comprising using an IP address of a message-routing host registered beforehand in the Well Know Service (WKS) record of the DNS as a way of querying the WKS record to find the IP address of the message-routing-in-charge host.

9. The method according to claim 5, further comprising using the property that a name of message-sending service can be regarded as an alias of the message-routing host to find the IP address of the message-routing-in-charge host by regarding the name of message-sending service as a querying name.

10. The method according to claim 5, further comprising, if the list does not contain an IP address, keeping the message in the sending host for a predetermined time, then proceeding to step a.

* * * * *